(12) United States Patent
Watanabe

(10) Patent No.: US 12,038,899 B1
(45) Date of Patent: Jul. 16, 2024

(54) DATA ANNOTATION METHOD AND SYSTEM FOR UNSTRUCTURED DATA INTEGRATING WITH DATA CATALOG

(71) Applicant: HITACHI, Ltd., Tokyo (JP)

(72) Inventor: Satoru Watanabe, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/213,303

(22) Filed: Jun. 23, 2023

(51) Int. Cl.
*G06F 16/22* (2019.01)
*G06F 16/31* (2019.01)

(52) U.S. Cl.
CPC ........ *G06F 16/2291* (2019.01); *G06F 16/313* (2019.01)

(58) Field of Classification Search
CPC ...... G06F 16/36; G06F 16/285; G06F 16/182; G06F 16/3329; G06F 16/906; G06F 16/907; G06F 16/9535
See application file for complete search history.

(56) References Cited

U.S. PATENT DOCUMENTS

| | | |
|---|---|---|
| 10,346,358 B2 | 7/2019 | Gorelik |
| 10,983,963 B1 | 4/2021 | Venkatasubramanian et al. |
| 11,119,980 B2 | 9/2021 | Szczepanik et al. |
| 2015/0324454 A1* | 11/2015 | Roberts ............. G06F 16/24578 707/734 |
| 2018/0165723 A1* | 6/2018 | Wright .................... G06F 40/30 |
| 2021/0241163 A1* | 8/2021 | Witztum ............... G06F 16/285 |

* cited by examiner

*Primary Examiner* — Baoquoc N To
(74) *Attorney, Agent, or Firm* — Procopio, Cory, Hargreaves & Savitch LLP

(57) ABSTRACT

A method for performing data management that includes generating, using a processor of an agent server, terms for structured data files using structured data profiling and terms for unstructured data files using unstructured data profiling, wherein the structured data files and the unstructured data files are stored in a storage; and managing a term list, wherein the term list stores terms generated by the processor, wherein the processor utilizes terms generated through structured data profiling in deriving terms generated through unstructured data profiling.

20 Claims, 14 Drawing Sheets

801

Name, address, nationality
Wang Joy, Santa Clara, CA 95054, US
Lau Anthony, San Jose, CA, 95053, US
⋮

| Name | Address | Nationality |
|---|---|---|
| Wang Joy | Santa Clara | US |
| Lau Anthony | San Jose | US |
| ⋮ | ⋮ | ⋮ |

Insurance contract

| | |
|---|---|
| Customer name | Lau Anthony |
| Duration | 1 year |
| Period of insurance | 2022/1/1-2022-12-31 |
| Deduction | $500 |

Hi Ellen,
I'll send you the list of the most prominent prospective customers.
Their responses to our customer survey were positive.
They all lived in US and have plans to purchase our products.

Best regards,

FIG. 11

| Agent ID | Suggested Business Term | Table/ file name | Column name | Supplement information | Decision |
|---|---|---|---|---|---|
| 1 | Name | Customers | Customer name | | Accept / Reject / Modify term |
| 1 | Insurance contract | Contract1.pdf | | Customer name Lau Anthony | Accept / Reject / Modify term |
| 1 | Customer survey | Email1.msg | | Their response to our customer survey were positive | Accept / Reject / Modify term |
| 2 | Accident | Image.png | | | Accept / Reject / Modify term |
| ⋮ | ⋮ | ⋮ | ⋮ | ⋮ | ⋮ |

Start data crawling — 1201

FIG. 12

DATA ANNOTATION METHOD AND SYSTEM FOR UNSTRUCTURED DATA INTEGRATING WITH DATA CATALOG

BACKGROUND

Field

The present disclosure is generally directed to a method and a system for performing data management.

Related Art

A data lake is a related art approach for managing data in enterprise systems. Data lake manages multiple types of data that include structured data (table, CSV, JSON, etc.) and unstructured data (email, documents, PDF, video, etc.). Nowadays, data lake has become an indispensable part of achieving integrated data analytics in enterprises.

One of the major difficulties in utilizing data lake lies in "data search", meaning that it is difficult for users to find proper data for their data analytics. To alleviate this difficulty, a data catalog is employed in data lake. Data catalog provides listing of data in the data lake and makes it easier to identify and locate data.

A data catalog includes the following components: a data crawler and a data profiler. The data crawler finds all the data contained in the data lake and develops listings of data contained in the data lake. On the other hand, the data profiler performs the function of profiling the data contained in the data lake for data the search.

FIG. 1 illustrates a data management system employing a related art data lake approach. The data crawlers find all the data in the data lake in each agent. The data profiler extracts the characteristics of the identified data. The results of the data profiling are provided to the data steward. Using the profiling results, the data steward then defines business terms based on the data profiles, meaning that the steward defines common terms to the similar data, such as address, vehicle number, name, and age, etc. Utilizing data catalog, users cannot only obtain data lists of the data lake but search the data using business terms for their data analytics. Thus, the efficiency of data search is improved by utilizing data catalog.

In the related art, a method for improving the efficiency to profile large data sets is disclosed. The method parses the files using several parsers to generate a schema. Document/file format can be discovered by attempting to parse the file using several parsers. However, the method does not utilize the definition of business terms obtained from structured and unstructured data in performance of file parsing.

In the related art, a method for identifying and categorizing data through advanced machine learning algorithms is disclosed. The method provides a visual representation of the category of data infrastructure distributed across datacenters and multiple clusters. However, this related art method does not also utilize the definition of business terms for enabling data discovery.

In the related art, a method for implementing a cognitive data lake that selects or recommends operation database based on historically created data lakes is disclosed. This related art method provides operational database selection or recommendation based on historically created data lakes storing files with similar file times, categorizations, metadata, and frequency of file usage. However, the method does not utilize such information for improving the efficiency of business term definition.

However, the related art approaches as disclosed above define the business terms of structured and unstructured data separately. As a result, there are various problems and disadvantages. For example, in the related art approaches, the definition of business terms in structured data is not efficiently utilized in association with unstructured data, and vice versa.

SUMMARY

Aspects of the present disclosure involve an innovative method for performing data management. The method may include generating, using a processor of an agent server, terms for structured data files using structured data profiling and terms for unstructured data files using unstructured data profiling, wherein the structured data files and the unstructured data files are stored in a storage; and managing a term list, wherein the term list stores terms generated by the processor, wherein the processor utilizes terms generated through structured data profiling in deriving terms generated through unstructured data profiling.

Aspects of the present disclosure involve an innovative non-transitory computer readable storage medium, storing instructions for performing data management. The instructions may include generating, using a processor of an agent server, terms for structured data files using structured data profiling and terms for unstructured data files using unstructured data profiling, wherein the structured data files and the unstructured data files are stored in a storage; and managing a term list, wherein the term list stores terms generated by the processor, wherein the processor utilizes terms generated through structured data profiling in deriving terms generated through unstructured data profiling.

Aspects of the present disclosure involve an innovative server system for performing data management. The system may include generating, using a processor of an agent server, terms for structured data files using structured data profiling and terms for unstructured data files using unstructured data profiling, wherein the structured data files and the unstructured data files are stored in a storage; and managing a term list, wherein the term list stores terms generated by the processor, wherein the processor utilizes terms generated through structured data profiling in deriving terms generated through unstructured data profiling.

Aspects of the present disclosure involve an innovative system for performing data management. The system may include means for generating, using a processor of an agent server, terms for structured data files using structured data profiling and terms for unstructured data files using unstructured data profiling, wherein the structured data files and the unstructured data files are stored in a storage; and means for managing a term list, wherein the term list stores terms generated by the processor, wherein the processor utilizes terms generated through structured data profiling in deriving terms generated through unstructured data profiling.

Aspects of the present disclosure involve an innovative server system for performing data management. The system may include at least one agent server, each of the at least one agent server comprises: at least one processor configured to: perform structured data profiling for generating terms for structured data files; and perform unstructured data profiling for generating terms for unstructured data files; at least one storage, wherein each storage is associated with a respective agent server, and stores structured data files and unstructured data files; and a management server in communication with the at least one agent server, the management server comprises: a management processor configured to manage a term list, wherein the term list stores terms generated by the at least one processor, wherein each of the at least one processor is configured to utilize terms generated by performing structured data profiling in deriving terms generated by performing unstructured data profiling.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 8 illustrates an example structured data file 801, in accordance with an example implementation.

FIG. 9 illustrates an example structured data file 901, in accordance with an example implementation.

FIG. 10 illustrates an example unstructured data file 1001, in accordance with an example implementation.

FIG. 11 illustrates an example unstructured data file 1101, in accordance with an example implementation.

FIG. 12 illustrates an example display 1200 of the data catalog operator 209, in accordance with an example implementation.

DETAILED DESCRIPTION

Figure 1:
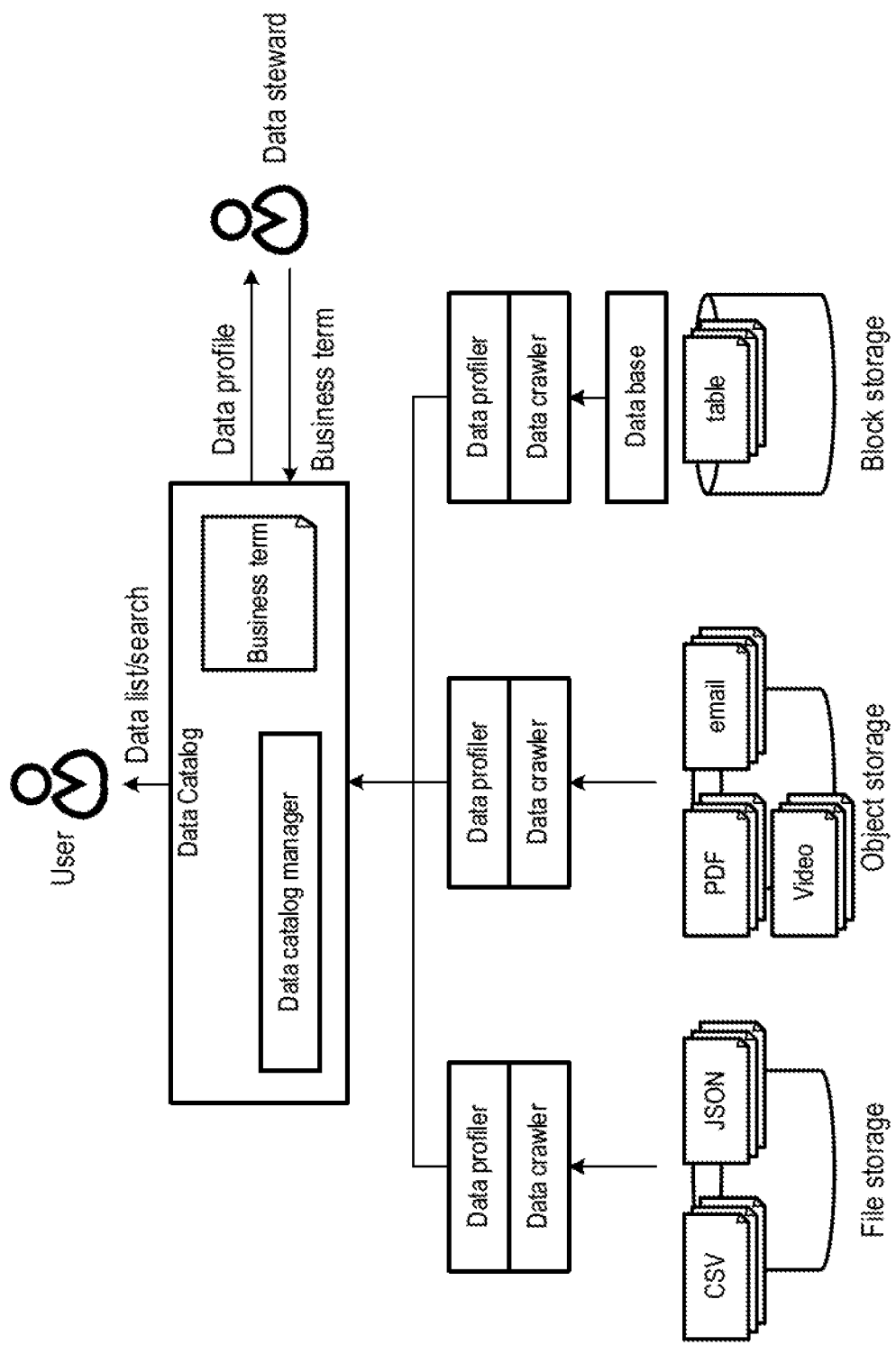
FIG. 1 illustrates a data management system employing a related art data lake approach.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 2:
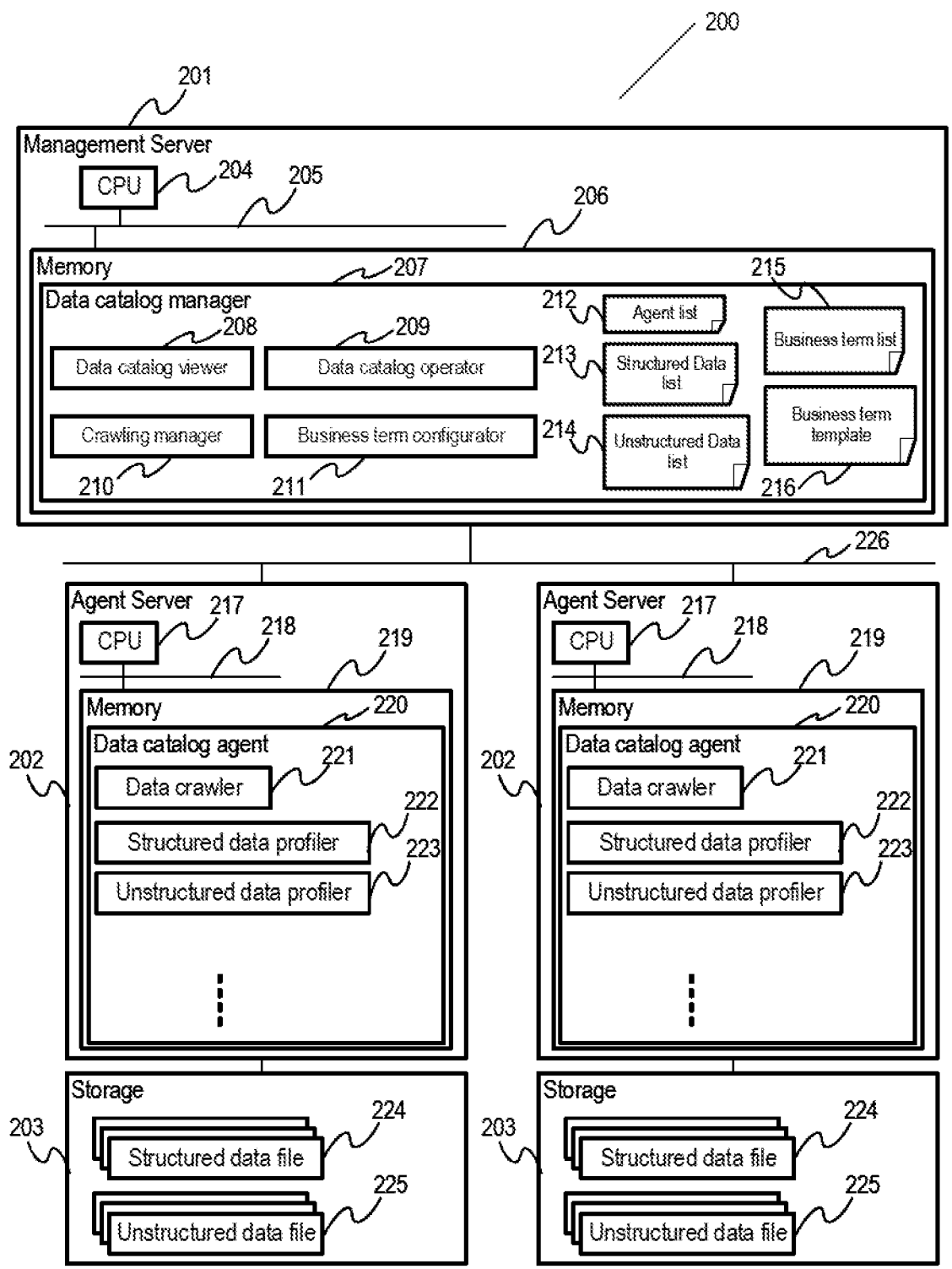
FIG. 2 illustrates an example block diagram of a data annotation system 200, in accordance with an example implementation.

FIG. 2 illustrates an example block diagram of a data annotation system 200, in accordance with an example implementation. As illustrated in FIG. 2, the data annotation system 200 may include components such as, but not limited to management server 201, agent servers 202, and storages 203. The management server 201 may include components such as a central processing unit (CPU) 204, an inner network 205, a memory 206, and a data catalog manager 207. The inner network 205 facilitates communication between CPU 204 and the various components. The memory 206 stores the data catalog manager 207. The data catalog manager 207 may include software components such as a data catalog viewer 208, a data catalog operator 209, a crawling manager 210, a business term configurator 211, an agent list 212, a structured data list 213, an unstructured data list 214, a business term list 215, and a business term template 216.

The data catalog viewer 208 generates and compiles listing displays of data entries and associated information for user to search and review. The data catalog operator 209 performs display of business term suggestions for user to review and select. The crawling manager 210 manages crawled data. The business term configurator 211 performs generation of suggested business terms.

The agent list 212 stores agent server information for identifying and locating each agent server. The structured data list 213 stores information pertaining to listing of structured data. The unstructured data list 214 stores information pertaining to listing of unstructured data. The business term list 215 store information pertaining to business term identifiers and associated definition/description. The business term template 216 stores information pertaining to structural template in association with business terms. The crawling manager 210 utilizes the agent list 212, the structured data list 213, the unstructured data list 214, the business term list 215, and the business term template 216 to perform data crawling.

The management server 201 communicates with agent servers 202 through a network 226. Each agent server 202 may include components such as a CPU 217, a bus 218, and a memory 219. CPU 217 communicates with the memory 219 through the bus 218. The memory 219 may include a data catalog agent 220, which may include components such as, but not limited to, a data crawler 221, a structured data profiler 222, and an unstructured data profiler 223. Details of the data crawler 221, the structured data profiler 222, and the unstructured data profiler 223 are described in detail below.

Each agent server 202 is connected to a respective storage 203, which stores structured data files 224 and unstructured data files 225. The data crawler 221 searches for data files from corresponding storage 203 by searching through the structured data files 224 and the unstructured data files 225. Data files that are identified and found are then data profiled using one of the structured data profiler 222 or the unstructured data profiler 223 depending on the file type.

Figure 3:
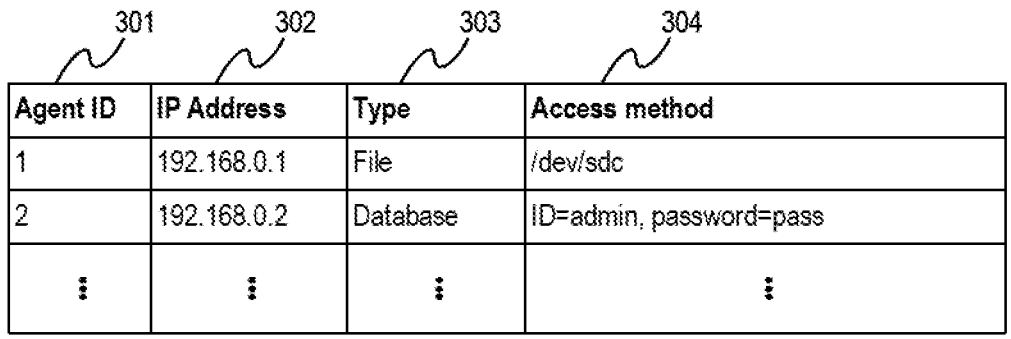
FIG. 3 illustrates an example agent list 212, in accordance with an example implementation.

FIG. 3 illustrates an example agent list 212, in accordance with an example implementation. The agent list 212 may include information such as, but not limited to, agent ID 301, internet protocol (IP) address 302, type 303, and access method 304. The agent ID 301 is the identifier of the agent server 202. The IP address 302 is the network address of the agent server 202. The type 303 denotes the type of data in the agent server 202, such as file, database, etc. The access method 304 denotes the access method to the data.

Figure 4:
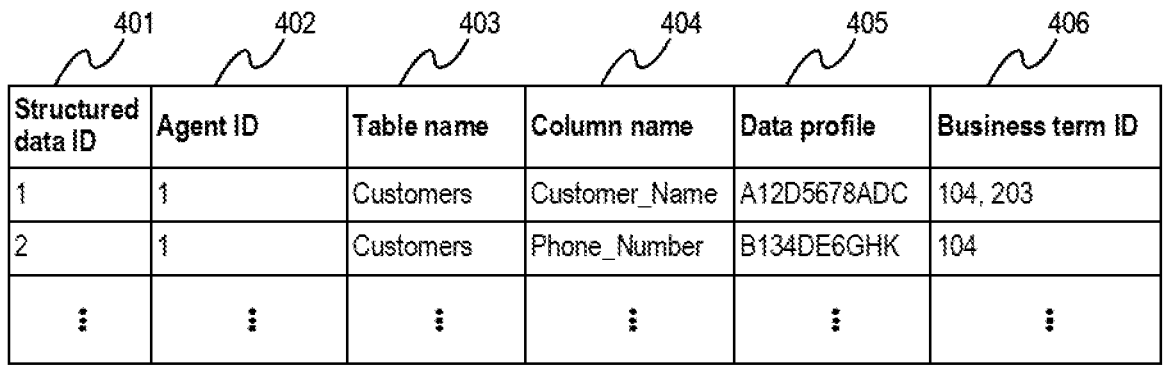
FIG. 4 illustrates an example structured data list 213, in accordance with an example implementation.

FIG. 4 illustrates an example structured data list 213, in accordance with an example implementation. The structure data list 213 may include information such as, but not limited to, structured data ID 401, agent ID 402, table name 403, column name 404, data profile 405, and business term ID 406. The structured data ID 401 is the identifier of the structure data. The agent ID 402 is the agent ID 301 that stores the data. The table name 403 indicates the structured data name. The column name 404 denotes the column name in the data. The data profile 405 denotes data characteristic. The business tam ID 406 denotes the business terms tagged to the data, corresponding the ID defined in the business term list 215.

Figure 5:
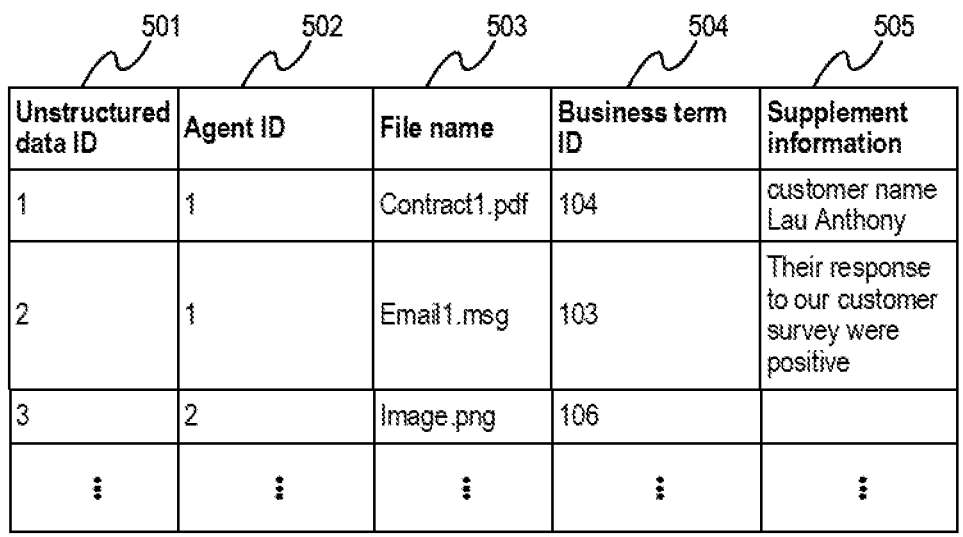
FIG. 5 illustrates an example structured data list 214, in accordance with an example implementation.

FIG. 5 illustrates an example structured data list 214, in accordance with an example implementation. The structured data list 214 may include information such as, but not limited to, unstructured data ID 501, agent ID 502, file name 503, business term ID 504, and supplement information 505. The unstructured data ID 501 is the identifier of the unstructured data. The agent ID 502 is the agent ID 301 that stores the data. The file name 503 indicates the name of the unstructured data file 225 that stores the data. The business term ID 504 denotes the business terms tagged to the data, corresponding to ID defined in the business term list 215. The supplement information 505 denotes additional information regarding the unstructured data and business tem.

Figure 6:
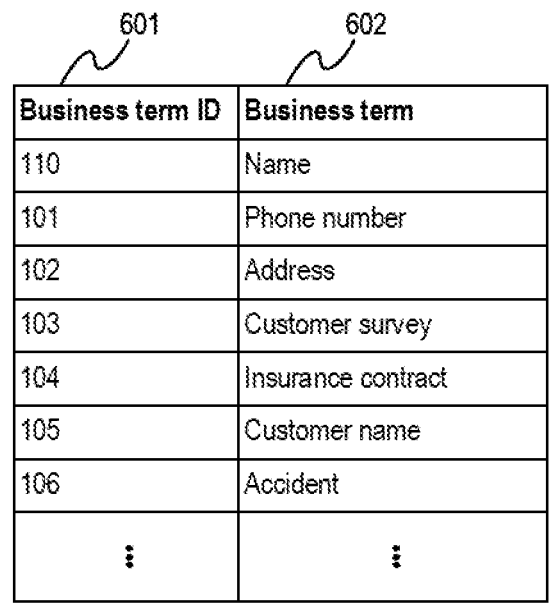
FIG. 6 illustrates an example business term list 215, in accordance with an example implementation.

FIG. 6 illustrates an example business term list 215, in accordance with an example implementation. The business term list 215 may include information such as, but not limited to, business term ID 601 and business term 602. The business term ID 601 is the identifier of the business term. The business term 602 denotes the business terms associated with the business term ID 601.

Figure 7:
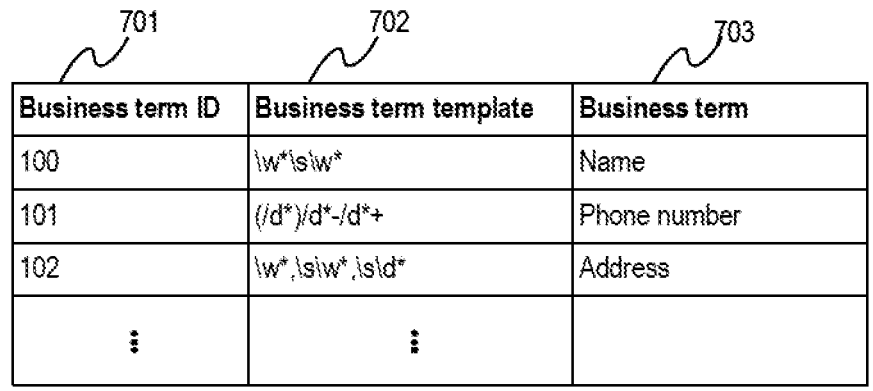
FIG. 7 illustrates an example business term template 216, in accordance with an example implementation.

FIG. 7 illustrates an example business term template 216, in accordance with an example implementation. As illustrated in FIG. 7, the business term template 216 may include information such as, but not limited to, business term ID 701, business term template 702, and business term 703. The business term ID 701 is the identifier of the business term. The business term template 702 denotes term templates illustrating proximity and relation among words and digits associated with business term template 702. The business term 703 denotes the business terms associated with the business term ID 601. Taking the second entry as example, the business term ID "101" has an associated business term template "(/d*)/d*–/d*" and a defined business term "phone number". This means that textual string matching the business term template of "(/d*)/d*–/d*", where "/d*" denotes digits/numbers, is to be associated with the business term "phone number."

FIG. 8 illustrates an example structured data file 801, in accordance with an example implementation. As illustrated in FIG. 8, the structured data file 801 contains column data organized in the order of column names name, address, and nationality. FIG. 9 illustrates an example structured data file 901, in accordance with an example implementation. As illustrated in FIG. 9, the structured data file 901 contains column data organized in the column names/categories of name, address, and nationality. The columns are separated into charted columns as opposed to commas as shown in FIG. 8.

FIG. 10 illustrates an example unstructured data file 1001, in accordance with an example implementation. As illustrated in FIG. 10, while the unstructured data file 1001 may include information in an organized format (e.g. categorized information), the information is not otherwise a structured listing of data when compared to the examples of structured data files 801 and 901 as shown in FIGS. 8 and 9. FIG. 11 illustrates an example unstructured data file 1101, in accordance with an example implementation. As illustrated in FIG. 11, unstructured data file may take a less organized form than that of FIG. 10. For example, unstructured data file 1101 illustrates an email communication containing information in the body of the communication.

FIG. 12 illustrates an example display 1200 of the data catalog operator 209, in accordance with an example implementation. The display 1200 lists the data profiles developed by the structured data profiler 222 and the unstructured data profiler 223. The display 1200 may display information including, but not limited to, start button 1201, agent ID 1202, suggested business term 1203, table/file name 1204, column name 1205, supplement information 1206, and decision 1207. Clicking of the start button 1201 initiates the data crawling process. The agent ID 1202 identifies the agent server that stores the data. Suggested business term 1203 denotes business terms populated as suggestion by the business term configurator 211. Details of the suggested business term generation process are described in details in FIGS. 15 and 17 below. Table/file name 1204 is similar to table name 403 of FIG. 4 and file name 503 of FIG. 5, and is associated with business term as suggested. Column name 1205 is similar to column name 404 of FIG. 4 and is associated with business term as suggested. Supplement information 1206 is similar to supplement information of 505 of FIG. 5 and is associated with business term as suggested. Decision 1207 may include user selectable decision buttons such as accept button 1208, reject button 1209, and modify term button 1210. A user is prompted with the option of accepting the suggestion as generated, reject the suggestion, or to modify ten(s) associated with the suggestion. If the accept button 1208 is selected, the user accepts the suggested business term 1203 associated with the entry, and the business catalog operator 209 updates the business term list 215 for registering the accepted business term.

If the reject button 1210 is selected, the user rejects the suggested business term 1203 associated with the entry, and the business catalog operator 209 does not update the business term list 215. On the other hand, if the modify term button 1211 is selected, the user then needs to modify the business term 1203 associated with the entry. Then the catalog operator 209 prompts the user to input a new business term, and updates the business term list 215 for registering the user-inputted business term.

Figure 13:
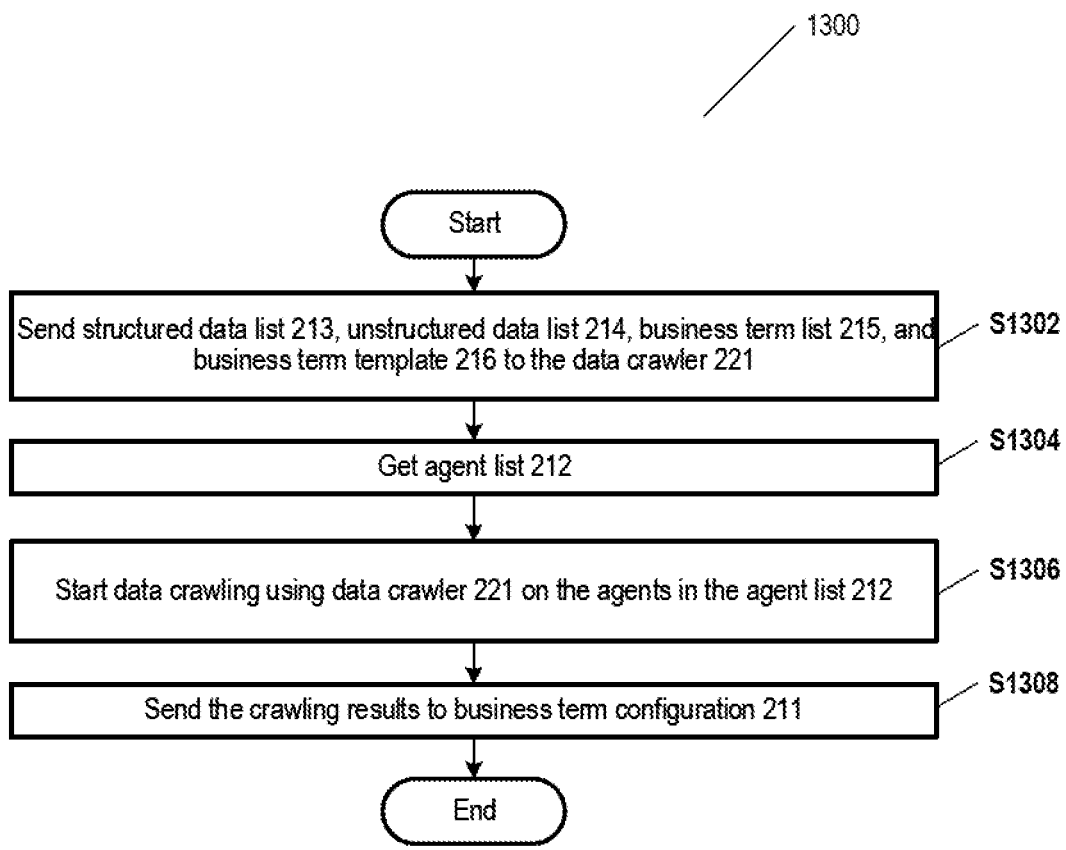
FIG. 13 illustrates an example process flow 1300 of a crawling manager 210, in accordance with an example implementation.

FIG. 13 illustrates an example process flow 1300 of a crawling manager 210, in accordance with an example implementation. The process begins at step S1302, where structured data list 213, unstructured data list 214, business term list 215, and business term template 216 are sent to the data crawler 221. At step S1304, agent list 212 is received. Data crawling is then initiated utilizing data crawler 221 on the agent servers contained in the agent list 212 at step S1306. At step S1308, the crawling results are sent to the business term configurator 211 for processing.

Figure 14:
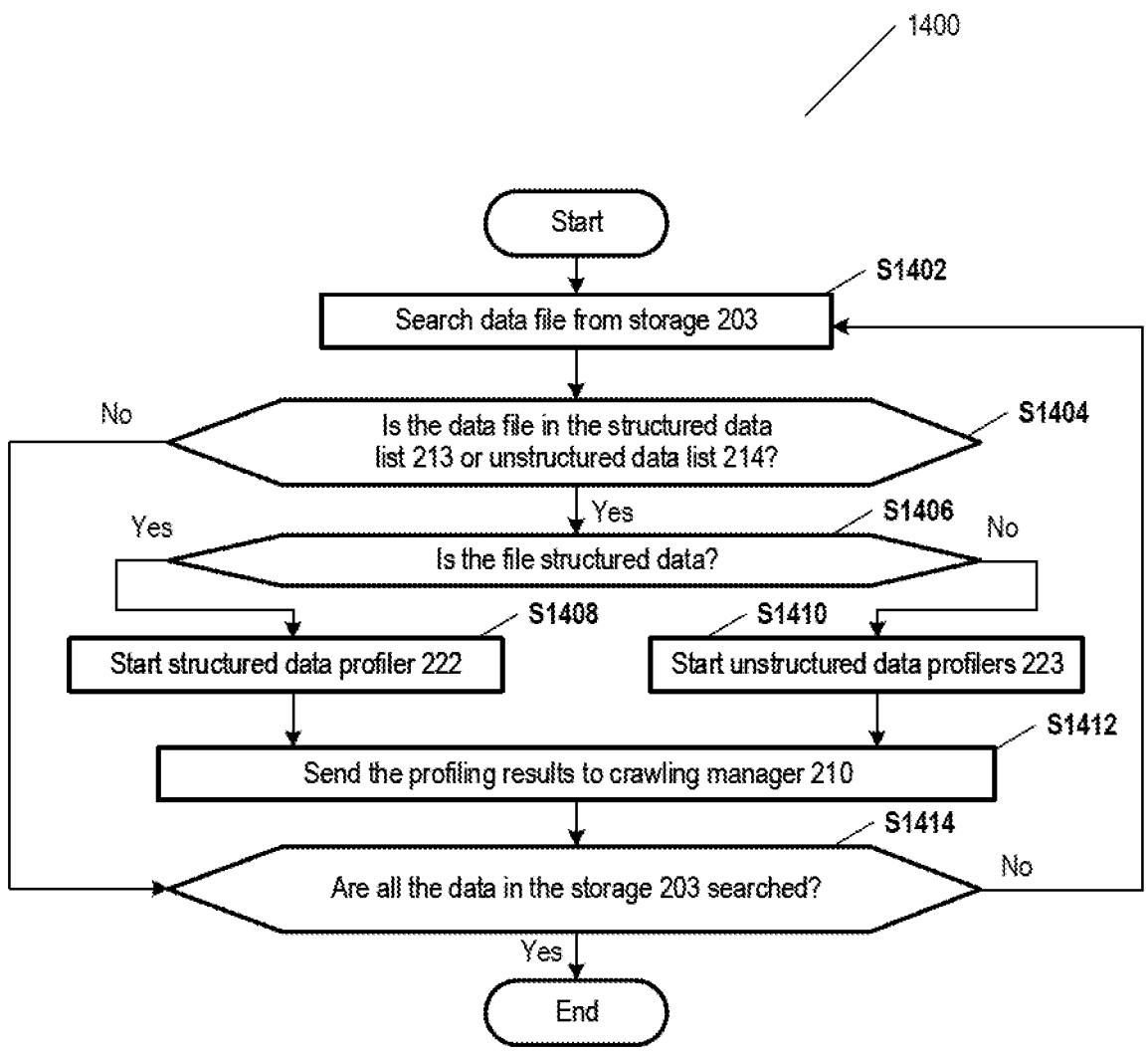
FIG. 14 illustrates an example process flow 1400 of a data crawler 221, in accordance with an example implementation.

FIG. 14 illustrates an example process flow 1400 of a data crawler 221, in accordance with an example implementation. The process begins at step S1402, where data file searching is performed on storage 203. At step S1404, a determination is made as to whether the data file is in the structured data list 213 or the unstructured data list 214. If the answer is no, then the process continues to step S1414, which will be described in more details below. If the answer is yes, then the process continues to step S1406, where a determination is made as to whether the file is of structured data.

If the answer is yes, then the process continues to step S1408. At step S1408, the structured data profiler 222 is initiated and performs data profiling on the data file. On completion of data profiling, the profiled result is sent to the crawling manager 210 at step S1412. On the other hand, if the answer is no at step S1406, then the process continues to step S1410, where the unstructured data profiler 223 is initiated and performs data profiling on the data file. On completion of data profiling, the profiled result is sent to the crawling manager 210 at step S1412.

On completion of step S1412, a determination is made as to whether all data files stored in the storage 203 have been searched at step S1414. If all data files have been searched, then the process comes to an end. On the other hand, if not all data files have been searched, then the process returns to step S1402, where the process continues until all data files have been searched.

Figure 15:
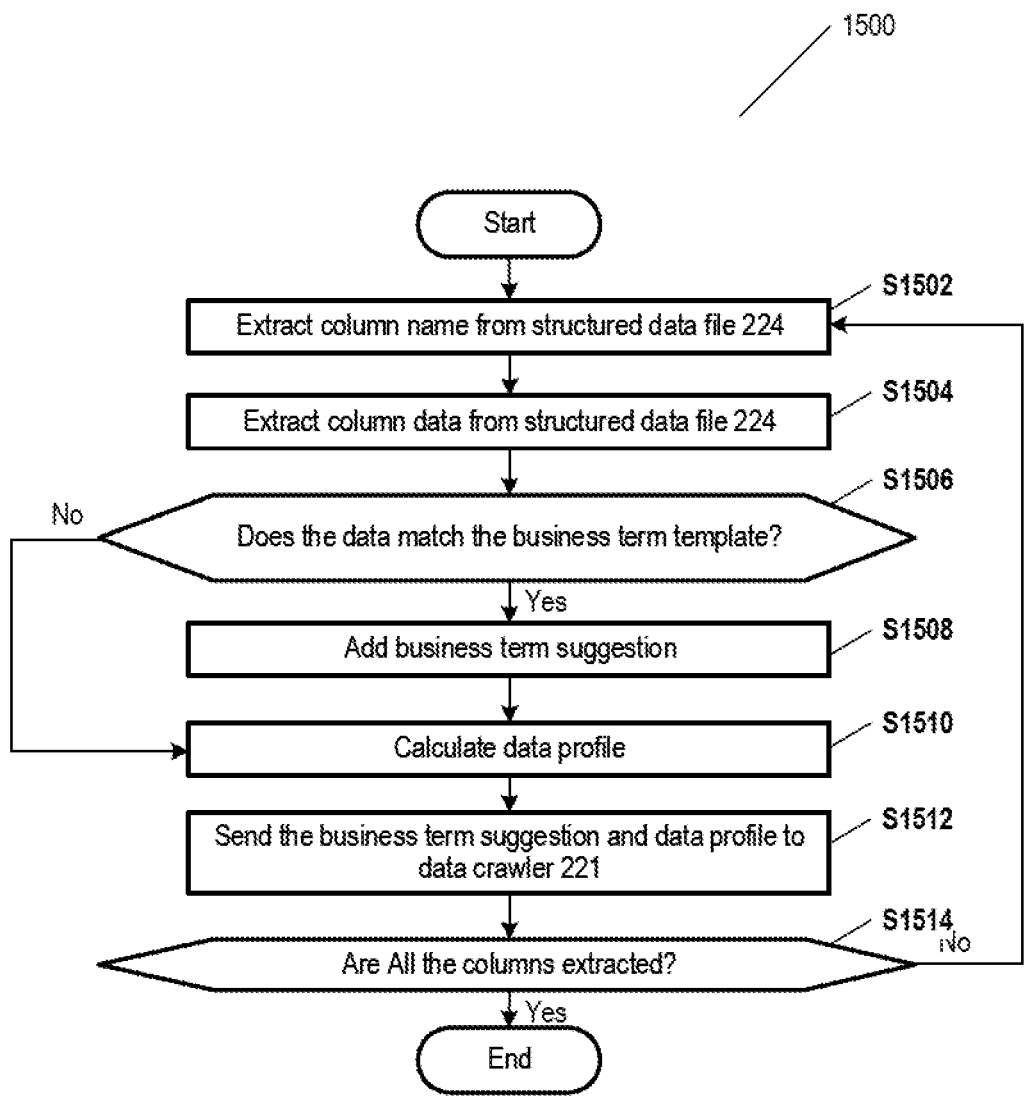
FIG. 15 illustrates an example process flow 1500 of structured data profiler 222, in accordance with an example implementation.

FIG. 15 illustrates an example process flow 1500 of structured data profiler 222, in accordance with an example implementation. As illustrated in FIG. 15, the process begins at step S1502, where column name is extracted from structured data file 224. At step S1504, column data is extracted from the structured data file 224. The process then continues to step S1506, where a determination is made as to whether the extracted column data match the business term template 702. Specifically, whether the extracted column data match with any templates illustrating proximity and relation among words and digits associated with business terms as contained in the business term template 702. At step S1508, business term suggestions are developed/added, which is described in more details in IG. 17 below.

Data profiling is then performed at step S1510 to examine, analyze, and summarize the extracted column data. On completion of data profiling, the data profile is then sent to the data crawler 221 at step S1512. If business term suggestion is performed at S1508, then the suggested business term is also sent to the data crawler 221 at step S1512. At step S1514, a determination is made as to whether all data columns have been extracted. If the answer is yes, then the process comes to a stop. If the answer is no, then the process continues to step S1502 to perform additional extraction.

Figure 16:
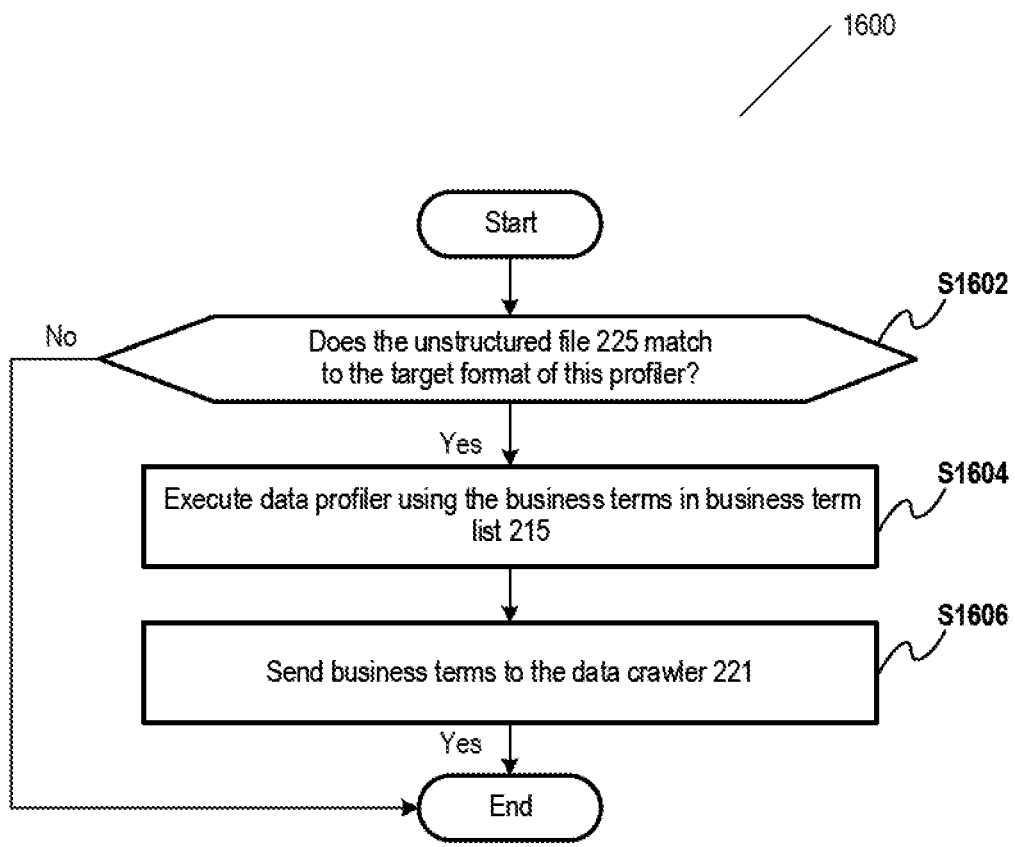
FIG. 16 illustrates an example process flow 1600 of unstructured data profiler 223, in accordance with an example implementation.

FIG. 16 illustrates an example process flow 1600 of unstructured data profiler 223, in accordance with an example implementation. At step S1602, a determination is made as to whether unstructured data file 225 matches to the target format of the unstructured data profiler 223. The determination is performed by investigating the file types from die file extension, and judging whether the file type matches with one of two data profilers.

At step S1604, data profiling is performed over the unstructured data file 225 using terms contained in the business term list 215. In the scenario where the unstructured data file 225 is an image, an image annotator is utilized for finding the object in the business term list 215. If the image annotator finds the object listed in the business term list 215 through cross referencing, the process then continues to step S1606, where the discovered business terms are sent to the data crawler 221. In some example implementations, supplement information associated with the unstructured data file 225 is also generated during step S1604 and sent along with the discovered business terms to the data crawler 221 at step S1606.

In the scenario where the unstructured data file 225 is a document containing tables, a document annotator is utilized for extracting data names and values from the tables contained in the document. At step S1604, the document annotator is used for finding the data in the business term list 215. If the document annotator matches the extracted data against the terms in the business term list 215 to find business terms. At S1606, the discovered business terms are then sent to the data crawler 221. In some example implementations, supplement information associated with the unstructured data file 225 is also generated during step S1604 and sent along with the discovered business terms to the data crawler 221 at step S1606.

In the scenario where the unstructured data file 225 is a document, a document annotator is utilized for summarizing the document. At step S1604, the document annotator is used for extracting sentences from the summary and matching terms contained in the sentences against the terms in the business term list 215. At S1606, the discovered business terms are then sent to the data crawler 221. In some example implementations, supplement information associated with the unstructured data file 225 is also generated during step S1604 and sent along with the discovered business terms to the data crawler 221 at step S1606.

In some example implementations, supplement information and terms generated through unstructured data profiling may be used to further generate additional/subsequent terms for the structured data files.

Figure 17:
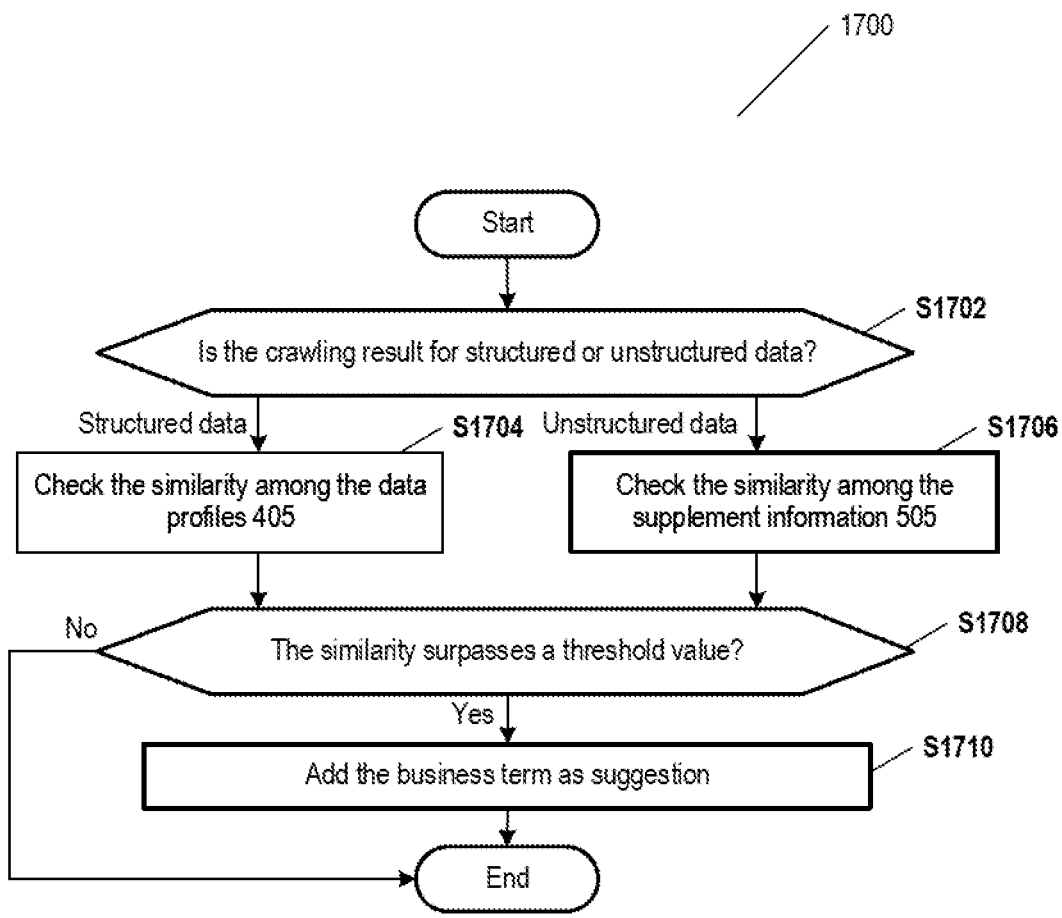
FIG. 17 illustrates an example process flow 1700 of business term configurator 211, in accordance with an example implementation.

FIG. 17 illustrates an example process flow 1700 of business term configurator 211, in accordance with an example implementation. At step S1702, a determination is made as to whether the crawling result, as generated by the crawling manager 210, relates to structured data or unstructured data. If the crawling result relates to structured data, then the process continues to step S1704, where the crawling result is checked against the data profiles 405 for similarity, which includes business term suggestions developed/added during step S1508. If the crawling result relates to unstructured data, then the process continues to step S1706, where the crawling result is checked against the supplement information 505 for similarity.

On completion of step S1704 or S1706, the process then proceeds to step S1708, where a determination is made as to whether similarity as determined at either step S1704 or S1706 surpasses a threshold value (similarity threshold). If the determined similarity passes the threshold at step S1708, then the associated business term is added as a suggestion at step S1710. If the determined similarity fails to surpass the threshold at step S1708, then the process comes to an end.

Figure 18:
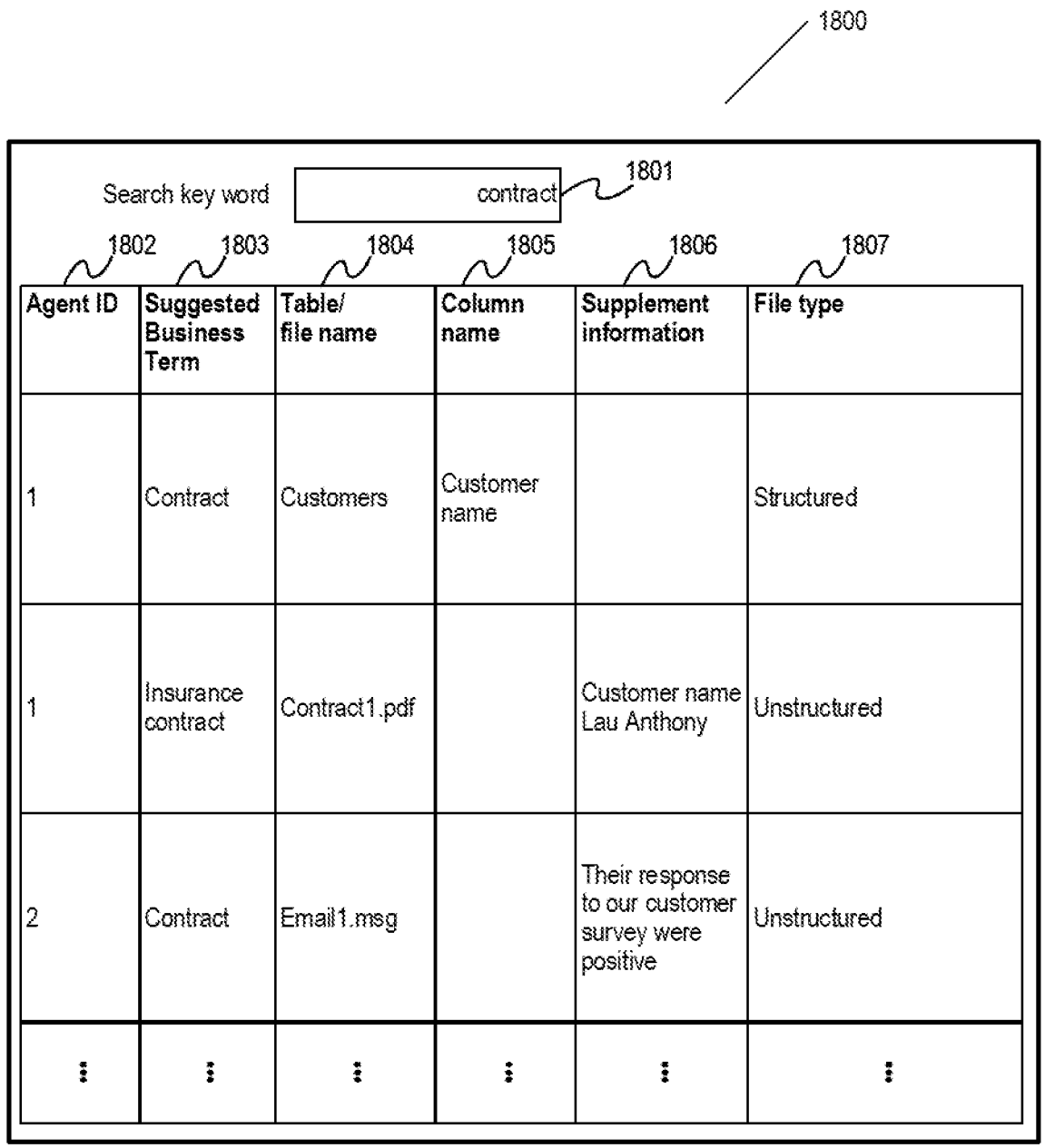
FIG. 18 illustrates an example output display 1800 of data catalog viewer 208, in accordance with an example implementation.

FIG. 18 illustrates an example output display 1800 of data catalog viewer 208, in accordance with an example implementation. As illustrated in FIG. 18, users may input search keywords in the search box 1801 to search among the data entries. The data catalog viewer 208 then searches the business term list 215, the structured data list 213, and the unstructured data list 214 in relation to the search keywords. The output display 1800 then displays information including agent ID 1802, suggested business term 1803, table/file name 1804, column name 1805, supplement information 1806, and file type 1807.

The foregoing example implementation may have various benefits and advantages. For example, improvement in the efficiency of developing business terms for unstructured data files utilizing business terms developed for structured data files, and vice versa. In addition, usefulness and accuracy of business terms in data lake is improved by collaborating the business terms developed for both structured and unstructured data.

Figure 19:
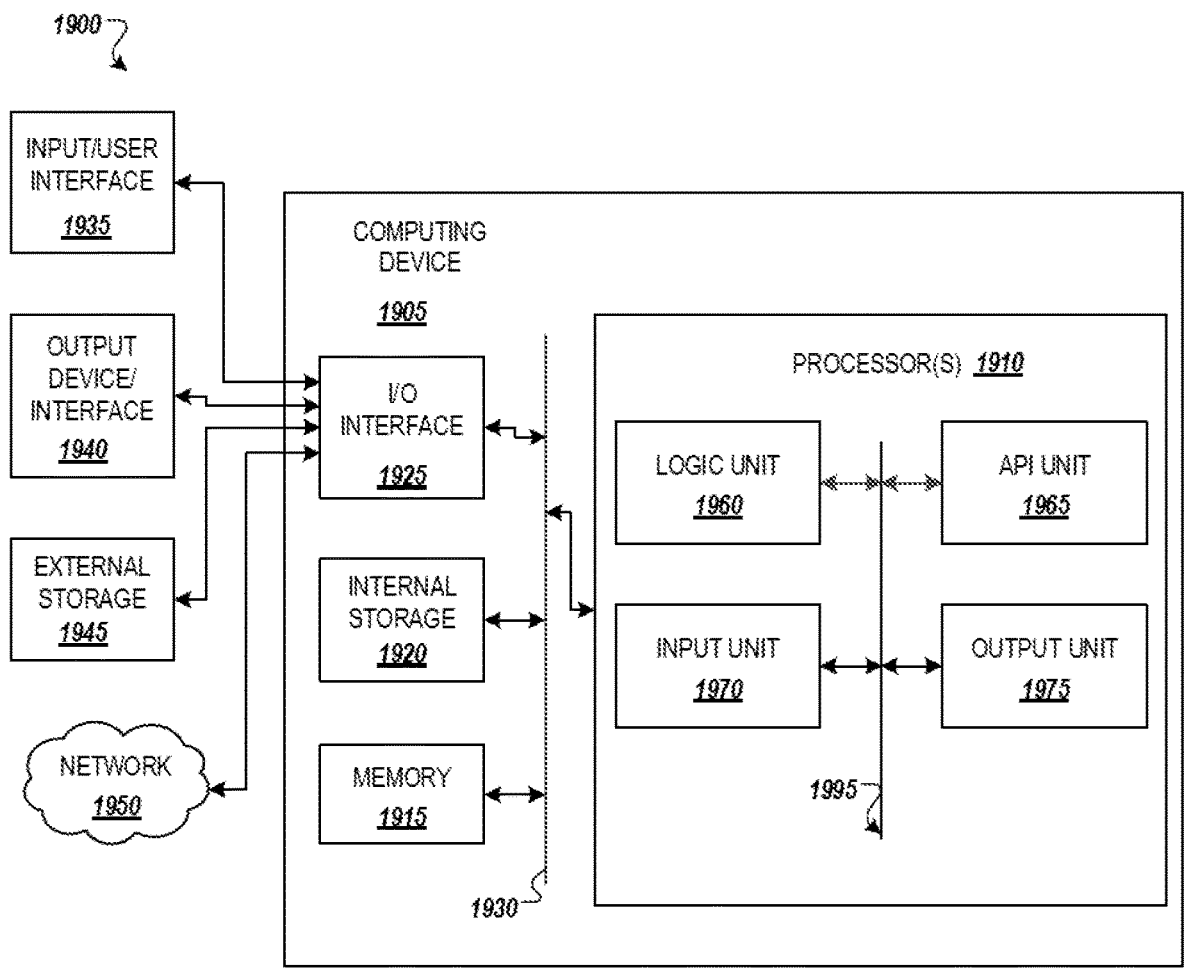
FIG. 19 illustrates an example computing environment with an example computer device suitable for use in some example implementations.

FIG. 19 illustrates an example computing environment with an example computer device suitable for use in some example implementations. Computer device 1905 in computing environment 1900 can include one or more processing units, cores, or processors 1910, memory 1915 (e.g., RAM, ROM, and/or the like), internal storage 1920 (e.g., magnetic, optical, solid-state storage, and/or organic), and/or IO interface 1925, any of which can be coupled on a communication mechanism or bus 1930 for communicating information or embedded in the computer device 1905. IO interface 1925 is also configured to receive images from cameras or provide images to projectors or displays, depending on the desired implementation.

Computer device 1905 can be communicatively coupled to input/user interface 1935 and output device/interface 1940. Either one or both of the input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1940 may include a display, television, monitor, printer, speaker, braille, or the like. In some example implementations, input/user interface 1935 and output device/interface 1940 can be embedded with or physically coupled to the computer device 1905. In other example implementations, other computer devices may function as or provide the functions of input/user interface 1935 and output device/interface 1940 for a computer device 1905.

Examples of computer device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1905 can be communicatively coupled (e.g., via IO interface 1925) to external storage 1945 and network 1950 for communicating with any number of networked components, devices, and systems, including one or more computer devices of the same or different configuration. Computer device 1905 or any connected computer device can be functioning as, providing services of, or referred to as a server, client, thin server, general machine, special-purpose machine, or another label.

IO interface 1925 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computer device 1905 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided. Processor(s) 1910 can be in the form of hardware processors such as central processing units (CPUs) or in a combination of hardware and software units.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, the input unit 1970, the output unit 1975, in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide an output based on the calculations described in example implementations.

Processor(s) 1910 can be configured to generate terms for structured data files using structured data profiling and terms for unstructured data files using unstructured data profiling, wherein the structured data files and the unstructured data files are stored in a storage as shown in FIG. 14. The processor(s) 1910 may also be configured to manage a term list, wherein the term list stores generated terms as shown in FIG. 14. The processor(s) 1910 may also be configured to utilize terms generated through structured data profiling in deriving terms generated through unstructured data profiling as shown in FIG. 14. The processor(s) 1910 may also be configured to manage a term list, wherein the term list stores generated terms generated as shown in FIGS. 1 and 14.

The processor(s) 1910 may also be configured to search for files stored in the storage to be used by the processor for term generation as shown in FIG. 1. The processor(s) 1910 may also be configured to generate supplement information related to the terms generated through unstructured data profiling and the unstructured data files as shown in FIGS. 5 and 12. The processor(s) 1910 may also be configured to, for unstructured data files containing images, perform image annotation to the images to identify objects from the images, cross reference the identified objects against terms in the ten list to find matching terms, and output the matching terms as generated terms for the unstructured data files containing the images as shown in FIG. 12. The processor(s) 1910 may also be configured to display the terms generated through structured data profiling and unstructured data profiling for a user to accept, reject, or modify each term of the generated terms for the structured data files and each term of the generated terms for the unstructured data file as shown in FIGS. 12 and 17.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A data management system, the system comprising:
   at least one agent server, each at least one agent server comprising:
   at least one processor configured to:
      perform structured data profiling for generating terms for structured data files; and
      perform unstructured data profiling for generating terms for unstructured data files;
   at least one storage, wherein each at least one storage is associated with a respective agent server, and stores the structured data files and the unstructured data files; and
   a management server in communication with the at least one agent server, the management server comprising:
      a management processor configured to manage a term list, wherein the term list stores terms generated by the at least one processor,
   wherein each of the at least one processor is configured to utilize terms generated by performing structured data profiling in deriving terms generated by performing unstructured data profiling.

2. The system of claim 1, wherein the at least one processor is further configured to perform data crawling, wherein the data crawling searches for files stored in associated storage to be used by associated processor for term generation.

3. The system of claim 1, wherein the at least one processor is further configured to generate supplement information related to terms generated by unstructured data profiling and the unstructured data files.

4. The system of claim 3, wherein the at least one processor is further configured to generate subsequent terms for the structured data files by using the terms and supplement information generated by unstructured data profiling.

5. The system of claim 3, wherein the at least one processor is further configured to generate supplement information by performing sentence extraction on the unstructured data files based on terms stored in the term list.

6. The system of claim 3, wherein:
for unstructured data files containing images, associated processor of the at least one processor performs image annotation to the images to identify objects from the images, cross references the identified objects against terms in the term list to find matching terms, and outputs the matching terms as generated terms for the unstructured data files containing the images.

7. The system of claim 1, wherein terms generated by structured data profiling and unstructured data profiling are displayed for a user to accept, reject, or modify each term of the generated terms for the structured data files and each term of the generated terms for the unstructured data file.

8. A method for performing data management, the method comprising:
generating, using a processor of an agent server, terms for structured data files using structured data profiling and terms for unstructured data files using unstructured data profiling, wherein the structured data files and the unstructured data files are stored in a storage; and
managing a term list, wherein the term list stores terms generated by the processor,
wherein the processor utilizes terms generated by structured data profiling in deriving terms generated by unstructured data profiling.

9. The method of claim 8, further comprising:
searching, by the processor, for files stored in the storage to be used by the processor for term generation.

10. The method of claim 8, further comprising:
generating, by the processor, supplement information related to the terms generated by unstructured data profiling and the unstructured data files.

11. The method of claim 10, further comprising:
generating, by the processor, subsequent terms for the structured data files by using the supplement information and the terms generated by unstructured data profiling.

12. The method of claim 10, wherein generating the supplement information comprises:
generating, by the processor, the supplement information by performing sentence extraction on the unstructured data files based on terms stored in the term list.

13. The method of claim 10, further comprising:
for unstructured data files containing images, performing, by the processor, image annotation to the images to identify objects from the images, cross referencing the identified objects against terms in the term list to find matching terms, and outputting the matching terms as generated terms for the unstructured data files containing the images.

14. The method of claim 8, further comprising:
displaying the terms generated by structured data profiling and unstructured data profiling for a user to accept, reject, or modify each term of the generated terms for the structured data files and each term of the generated terms for the unstructured data file.

15. A non-transitory computer readable storage medium, storing instructions for performing data management, the instructions comprising:
generating terms for structured data files using structured data profiling and terms for unstructured data files using unstructured data profiling, wherein the structured data files and the unstructured data files are stored in a storage; and
managing a term list, wherein the term list stores generated terms generated,
wherein generated terms are utilized by structured data profiling in deriving terms generated by unstructured data profiling.

16. The non-transitory computer readable storage medium of claim 15, further comprising:
searching for files stored in the storage to be used for term generation.

17. The non-transitory computer readable storage medium of claim 15, further comprising:
generating supplement information related to the terms generated by using structured data profiling and the unstructured data files.

18. The non-transitory computer readable storage medium of claim 17, further comprising:
generating subsequent terms for the structured data files by using the supplement information and the terms generated by unstructured data profiling.

19. The non-transitory computer readable storage medium of claim 17, wherein generating the supplement information comprises:
generating the supplement information by performing sentence extraction on the unstructured data files based on terms stored in the terms list.

20. The non-transitory computer readable storage medium of claim 17, further comprising:
for unstructured data files containing images, performing image annotation to the images to identify objects from the images, cross referencing the identified objects against terms in the terms list to find matching terms, and outputting the matching terms as generated terms for the unstructured data files containing the images.

* * * * *